(12) United States Patent
Okubo

(10) Patent No.: US 6,196,919 B1
(45) Date of Patent: Mar. 6, 2001

(54) SHOOTING GAME APPARATUS, METHOD OF PERFORMING SHOOTING GAME, AND COMPUTER-READABLE RECORDING MEDIUM STORING SHOOTING GAME PROGRAM

(75) Inventor: Akira Okubo, Sagae (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/082,816

(22) Filed: May 21, 1998

(30) Foreign Application Priority Data

May 23, 1997 (JP) .................................................. 9-134056

(51) Int. Cl.$^7$ .................................................. A63F 13/00
(52) U.S. Cl. .............................. 463/32; 463/30; 463/31; 463/32; 463/33; 463/34; 463/37; 463/38; 434/30; 434/33; 434/34; 434/35; 434/38; 434/43; 434/44; 434/69; 273/148 B
(58) Field of Search .................................. 463/2, 5–7, 31, 463/34, 30, 32, 37–38; 434/30, 33, 34, 35, 38, 43, 44, 69; 273/148 B; 345/475

(56) References Cited

U.S. PATENT DOCUMENTS

| | | | |
|---|---|---|---|
| 5,137,450 | * 8/1992 | Thomas | 434/44 |
| 5,190,286 | * 3/1993 | Watanabe et al. | 273/85 |
| 5,272,652 | * 12/1993 | Rosenshein et al. | 703/8 |
| 5,299,810 | * 4/1994 | Pierce et al. | 273/434 |
| 5,795,224 | 8/1998 | Yoshida . | |
| 5,973,704 | * 10/1999 | Nishiumi et al. | 345/475 |

FOREIGN PATENT DOCUMENTS

| | | |
|---|---|---|
| 0715280 | 6/1996 | (EP) . |
| 0778548 | 6/1997 | (EP) . |
| 08-257240 | 10/1996 | (JP) . |
| 0700010 | 3/1996 | (WO) . |
| WO96/37863 | 11/1996 | (WO) . |

OTHER PUBLICATIONS

Sandler et al. "The Official Turbografx Game Encyclopedia" pp 98, 153, 1990.*

* cited by examiner

Primary Examiner—Valencia Martin-Wallace
Assistant Examiner—Yveste G Cherubin
(74) Attorney, Agent, or Firm—Jordan and Hamburg LLP

(57) ABSTRACT

A CPU of a control system controls a signal processor to effect various calculations to move a player's spaceship on a projection display screen, orient the player's spaceship toward a shooting direction, move a camera position at a rear viewpoint toward the player's spaceship, and orient the shooting direction outside of the projection display screen, based on shooting game data including image data, audio data, and program data stored in recording medium. The CPU also controls an image processor to write image data and audio data into a RAM based on the calculated results from the signal processor. The image data thus written in the RAM is displayed on a television monitor and projected onto the projection display screen.

12 Claims, 9 Drawing Sheets

SHOOTING GAME APPARATUS, METHOD OF PERFORMING SHOOTING GAME, AND COMPUTER-READABLE RECORDING MEDIUM STORING SHOOTING GAME PROGRAM

BACKGROUND OF THE INVENTION

1. Field of the Invention

The present invention relates to a shooting game apparatus for performing a shooting game in three-dimensional graphic images with a rear viewpoint, a method of performing such a shooting game, and a computer-readable recording medium which stores a control program of such a shooting game.

2. Description of the Prior Art

Some shooting game apparatus display a player's maneuverable object, such as a spaceship or the like, in flight in a long perspective image representing a flight confinement range such as a large tubular structure. While in a shooting game, other objects such as meteorites and enemy's spaceships appear in front of and attack the player's spaceship. The game player operates the shooting game to shoot a laser beam or a missile to destroy those other objects or targets. The shooting game is finished when the player's spaceship is hit a predetermined times by enemy's spaceships.

FIG. 8 of the accompanying drawings schematically shows a longitudinal section of a perspective image representing a flight confinement range, which is displayed on the display screen of a conventional shooting game apparatus. FIG. 9 of the accompanying drawings shows the displayed perspective image as viewed at a sectional plane B—B of FIG. 8 from a rear viewpoint. The perspective image shown in FIG. 9 is displayed on the display screen in front of the game player.

As shown in FIGS. 8 and 9, while a player's spaceship 93 is in flight along a perceptive line 92 in a perspective image 91 representing a flight confinement range, the game player operates an analog joystick (not shown) to move the player's spaceship 93 vertically and horizontally to a desired position in the perspective image 91. When the game player presses a shooting switch on the joystick, a laser beam or a missile is shot forward from the player's spaceship 93.

When an enemy's spaceship 94, which is a target to be shot at, appears in front of the player's spaceship 93, the game player operates the joystick to move the player's spaceship 93 to a position in the sectional plane B—B which corresponds vertically or horizontally to a position in the perspective image 91 of the enemy's spaceship 94 in a sectional plane A—A of FIG. 8, and then presses the shooting switch to shoot a laser beam or a missile.

Since objects in the perspective image 91 look smaller farther into the perspective image 91 or the flight confinement range, if the enemy's spaceship 94 is spaced farther from the player's spaceship 93, then the enemy's spaceship 94 becomes smaller and closer to the vanishing point at the center of the perspective image 91. Therefore, the game player finds it more difficult to aim at the enemy's spaceship 94. Furthermore, because the game player sees the player's spaceship 93 obliquely from behind it, it is difficult for the game player to align the player's spaceship 93 with the enemy's spaceship 94 in the distant position, and to hit the enemy's spaceship 94 with a laser beam or a missile.

An enemy's spaceship 94 may appear relatively closely to the player's spaceship 93 in a peripheral area of the perspective image 91. If the game player needs to aim at the enemy's spaceship 94 in such a dogfight, then since the game player can only aim in a narrow range where a laser beam or a missile is shot toward the vanishing point, the game player finds it difficult to aim at the enemy's spaceship 94 that appears in the peripheral area of the perspective image 91.

SUMMARY OF THE INVENTION

It is therefore an object of the present invention to provide a shooting game apparatus for performing a shooting game which allows the game player to aim easily at a target in a distant position, and to shoot in a wide range for realistic shooting game experiences.

Another object of the present invention is to provide a method of performing such a shooting game.

Still another object of the present invention is to provide a computer-readable recording medium which stores a program of such a shooting game.

According to an aspect of the present invention, there is provided a shooting game apparatus for displaying a moving shooting object on a display screen and shooting from the moving shooting object in three-dimensional graphic images with a rear viewpoint. The shooting game apparatus comprises manual control means operable by a game player for entering a control signal, shooting object moving means for moving the shooting object forward on the projection display screen in response to a control signal from the manual control means, shooting processing means for shooting from the shooting object in response to a control signal from the manual control means, and controlling a shooting direction from the shooting object to have an angle toward outside of the display screen with respect to the direction in which the shooting object moves forward, shooting object orientation control means for controlling an orientation of the shooting object toward the shooting direction, and rear viewpoint position control means for controlling the rear viewpoint toward the shooting direction.

According to another aspect of the present invention, there is provided a method of performing a shooting game by displaying a moving shooting object on a display screen and shooting from the moving shooting object in three-dimensional graphic images with a rear viewpoint. The method comprises the steps of moving the shooting object forward on the projection display screen in response to a manual control signal, moving the rear viewpoint toward the shooting object, and controlling an orientation of the shooting object to move toward a shooting direction from the shooting object, and controlling the shooting direction to have an angle toward outside of the display screen with respect to the direction in which the shooting object moves forward.

According to still another aspect of the present invention, there is provided a computer-readable recording medium storing a control program for performing a shooting game by displaying a moving shooting object on a display screen and shooting from the moving shooting object in three-dimensional graphic images with a rear viewpoint. The control program comprises the steps of moving the shooting object forward on the projection display screen in response to a manual control signal, moving the rear viewpoint toward the shooting object, controlling an orientation of the shooting object to move toward a shooting direction from the shooting object, and controlling the shooting direction to have an angle toward outside of the display screen with respect to the direction in which the shooting object moves forward.

The shooting direction is controlled to be parallel to a vertical direction of the display screen.

The orientation of the shooting object and a position to be reached by the rear viewpoint are established such that the direction in which the shooting object moves forward and the direction of the shooting object, the direction of the shooting object and the shooting direction, and the direction in which the shooting object moves forward and the shooting direction become close to each other.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
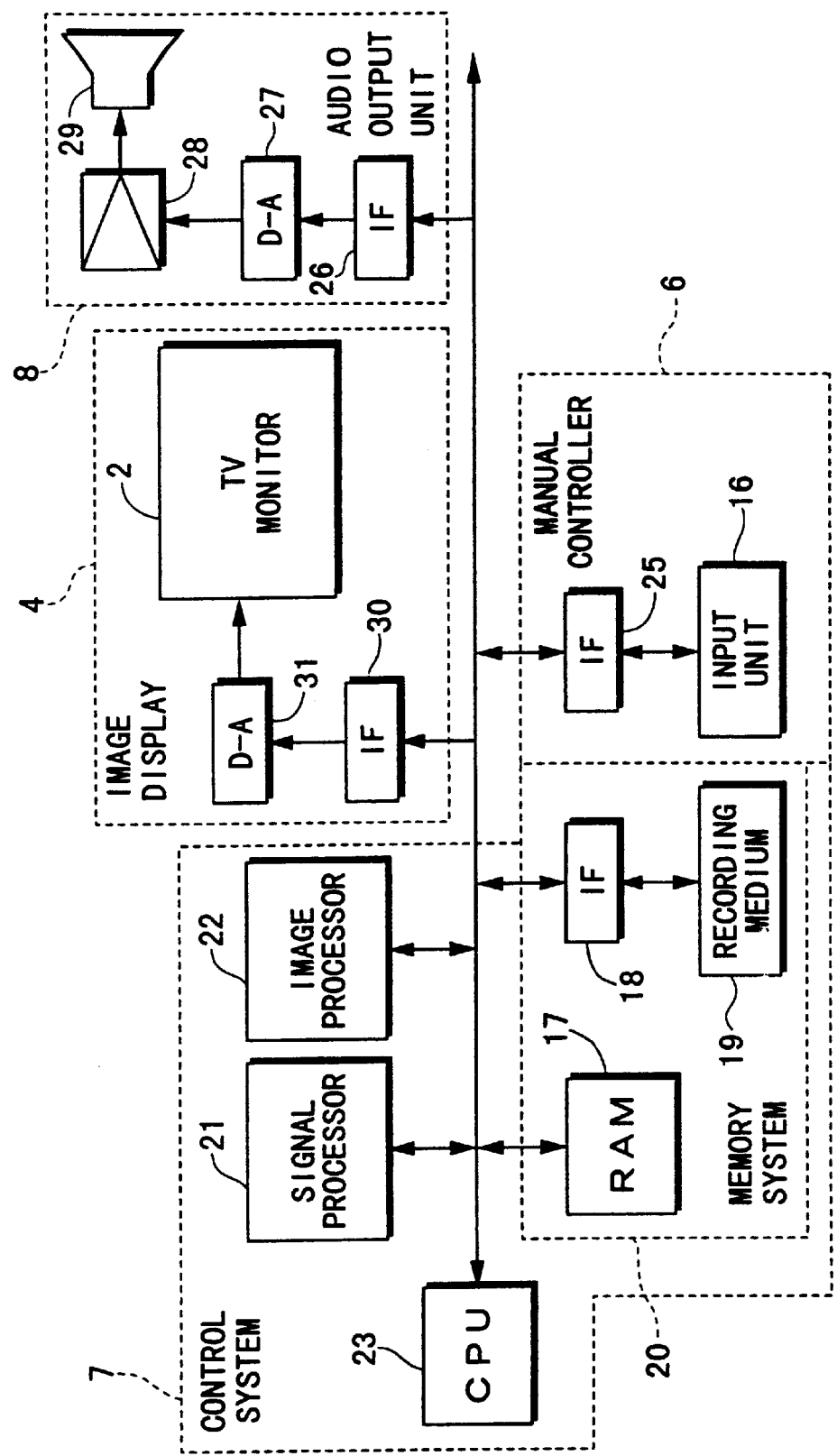
FIG. 1 is a block diagram of a shooting game apparatus according to the present invention.
Figure 2:
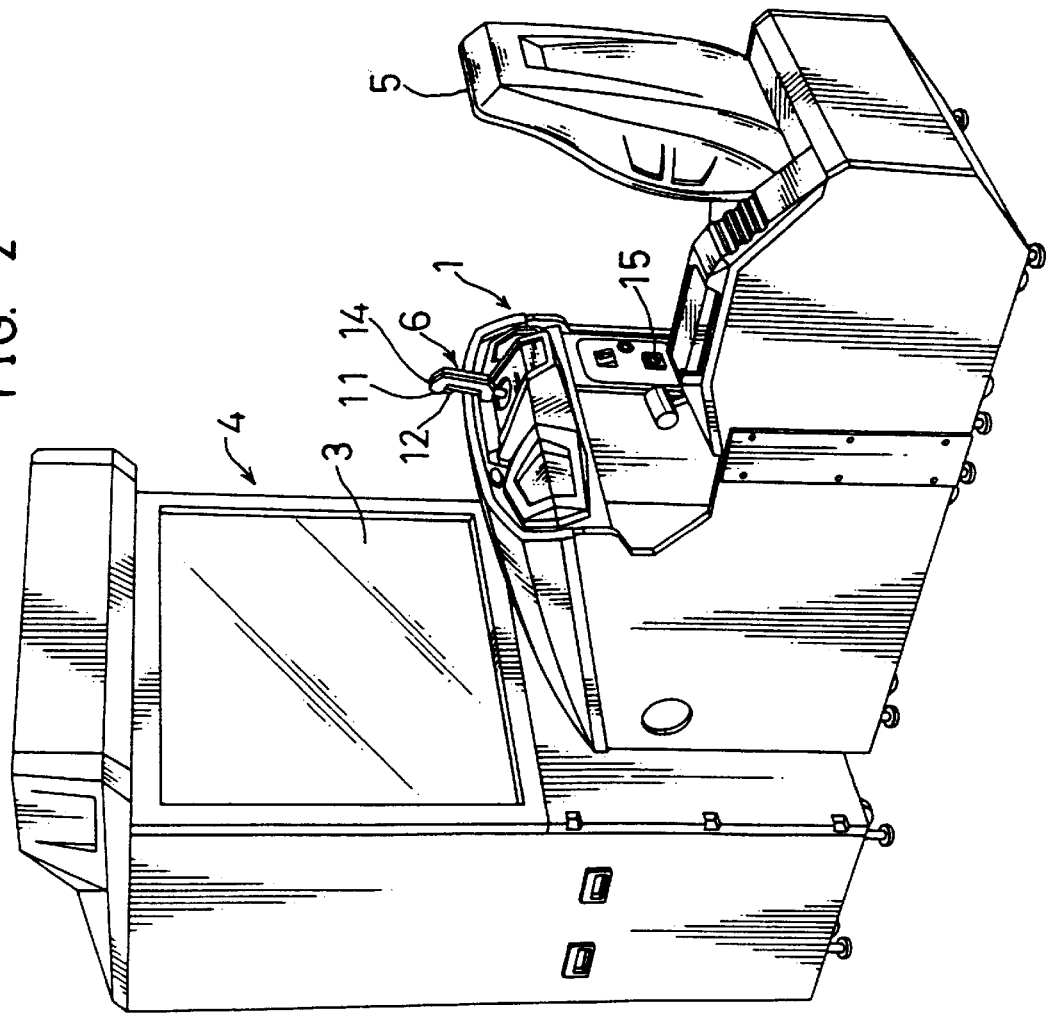
FIG. 2 is a perspective view of the shooting game apparatus shown in FIG. 1.

As shown in FIGS. 1 and 2, a shooting game apparatus according to the present invention generally comprises a main body 1 and an image display unit 4 disposed in front of the main body 1 and having a projection display screen 3 for displaying game images projected from a television monitor 2.

The main body 1 includes a seat 5 for the game player to be seated on, a manual controller 6 manually operable by the game player, a control system 7 for executing commands depending on control signals from the manual controller 6, and an audio output unit 8 for producing audio output signals depending on game images displayed on the projection display screen 3.

Figure 3:
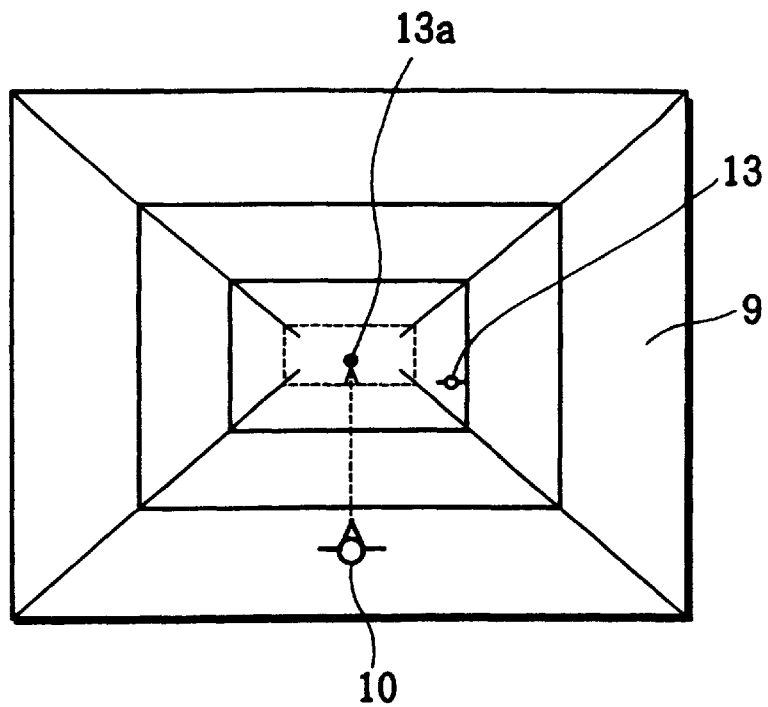
FIG. 3 is a view of an image displayed on the display screen of the shooting game apparatus before the camera position at a rear viewpoint is moved.

The manual controller 6 includes an input unit 16 which has an analog joystick 11 for moving the displayed position of a player's maneuverable spaceship 10 (shooting object) (see FIG. 3) vertically and horizontally in a perspective image 9 representing a flight confinement range displayed on the projection display screen 3, a switch 12 mounted on a front side of the joystick 11 and pressable by an index finger of the game player for shooting a laser beam or a bullet from the player's spaceship 10, a shooting switch 14 mounted on the upper end of the joystick 11 and pressable by a thumb of the game player for shooting a missile toward a target to be shot at, e.g., an enemy's space ship 13 or the like, and a start switch 15 below the joystick 11. The input nit 16 also has a viewpoint changing switch (not shown) for selecting one of three images, i.e., a close-up image closest to the player's spaceship 10, an overall image farthest from the player's spaceship 10, and an intermediate image between the close-up and overall images.

When the joystick 11 is in a vertical position, the control system 7 displays images i n the perspective image 9 on the projection display screen 3 so as to move toward the game player such that the player's spaceship 10 looks as if moving forward at a certain speed while being positioned at a constant location in the perspective image 9. When the joystick 11 is pushed forward from the vertical position, th e control system 7 displays images in the perspective image 9 on the projection display screen 3 such that the player's spaceship 10 descends in the perspective image 10 (moves downwardly in the displayed image). When the joystick 11 is pulled backward from the vertical position, the control system 7 displays images in the perspective image 9 on the projection display screen 3 such that the player's spaceship 10 ascends in the perspective image 10 (moves upwardly in the displayed image). When the joystick 11 is shifted to the left, the control system 7 displays images in the perspective image 9 on the projection display screen 3 such that the player's spaceship 10 turns to the left in the perspective image 10 (moves to the left in the displayed image). When the joystick 11 is shifted to the right, the control system 7 displays images in the perspective image 9 on the projection display screen 3 such that the player's spaceship 10 turns to the right in the perspective image 10 (moves to the right in the displayed image).

The control system 7 comprises a RAM 17 from and into which various data can be read and written, an interface 18, a signal processor 21, an image processor 22, and a central processing unit (CPU) 23 for controlling them. The RAM 17, the interface 18, the signal processor 21, the image processor 22, and the CPU 23 are interconnected by a bus 24 which comprises an address bus, a data bus, and a control bus. The input unit 16 of the manual controller 6 is connected via an interface 25 to the bus 24 for sending control signals via the bus 24 to the CPU 23, which executes various commands depending on supplied control signals.

A recording medium 19 from and into which data can be read and written is connected to the interface 18. The RAM 17, the interface 18, and the recording medium 19 jointly make up a memory system 20. The recording medium 19 stores shooting game data including image data, audio data, and program data. The recording medium 19 may be a ROM cassette which comprises a ROM storing program data including the shooting game data and an operating system and a plastic case housing the ROM, or an optical disk or a flexible disk.

The signal processor 21 mainly calculates two-dimensional positions, i.e., a position of the player's spaceship, a virtual camera position Vc, a camera position C to be reached, and a rotational angle of the player's spaceship, generates audio data, and processes the calculated positions and the generated audio data. The image processor 22 writes image data to be displayed into the RAM 17 based on calculated results from the signal processor 21. The CPU 23 controls the signal processor 21 to process signals based on the image data, the audio data, and the program data stored in the recording medium 19, and also controls the image processor 22 to write image data and audio data into the RAM 17 based on the signals processed by the signal processor 21.

The audio output unit 8 comprises an interface 26 connected to the bus 24, a D/A converter 27 for converting a digital signal from the interface 26 into an analog audio signal, an integrated amplifier 28 for amplifying the audio signal outputted from the D/A converter 27, and a speaker 29 for radiating sounds based on the audio signal amplified by the integrated amplifier 28. When the audio data written into the RAM 17 by the image processor 22 is supplied through the interface 26, the D/A converter 27, and the integrated amplifier 28 to the speaker 29, sounds are outputted from the speaker 29 as the shooting game processes.

The image display unit 4 comprises an interface 30 connected to the bus 24, a D/A converter 31 for converting a digital signal from the interface 30 into an analog image signal, and a television monitor 2 for outputting images based on the image signal outputted from the D/A converter 31. When the image data written into the RAM 17 by the image processor 22 is supplied through the interface 30 and the D/A converter 31 to the television monitor 2, images of the player's spaceship 10 and other objects in the perspective image 9 are displayed on the television monitor 2 and projected onto the projection display screen 3.

A control process carried out by the control system 7 including the CPU 23 which is controlled by the shooting game program recorded in the recording medium 19 and its control data will be described below with reference to FIGS. 3 through 6.

The control system 7 has various functional means as functions performed thereby. The functional means include a player's spaceship moving means for moving the player's spaceship 10 on the projection display screen 3 in response to a control signal from the analog joystick 11, a rear viewpoint position control means for controlling the camera position at a rear viewpoint toward a shooting direction, a shooting object orientation control means for controlling the orientation of the player's spaceship 10 to move toward the shooting direction, and a shooting processing means for shooting a missile response to a signal from the shooting switch and controlling the shooting direction to have an angle toward outside of the projection display screen 3 with respect to the direction in which the player's spaceship 10 moves forward.

Specifically, the CPU 23 controls the signal processor 21 to effect various calculations to cause the player's spaceship moving means to move the player's spaceship 10 on the projection display screen 3, the rear viewpoint position control means to calculate the camera moving position, i.e., calculate a virtual camera position Vc and a camera position C to be reached, the shooting object orientation control means to calculate a rotational angle of the player's spaceship 10, and the shooting processing means to shoot a missile, based on the shooting game data including the image data, the audio data, and the program data stored in the recording medium 19. The CPU 23 also controls the image processor 22 to write image data and audio data into the RAM 17 based on the calculated results from the signal processor 21. The image data thus written in the RAM 17 is displayed on the television monitor 2 and projected onto the projection display screen 3.

The shooting direction is oriented toward outside of the projection display screen 3 from the direction in which the player's spaceship 10 moves forward, in order to increase a space in which laser beams and missiles can be shot. Heretofore, the shooting direction agrees with the direction in which the player's spaceship moves forward, and any displayed object looks smaller in a narrower flight confinement range farther into the perspective image. Therefore, the game player finds it more difficult to aim at such a target displayed farther into the perceptive image. According to the present invention, since the space in which laser beams and missiles can be shot is wider, the game player can easily aim at a target irrespective of whether it is close or far in the perceptive image, and hence can enjoy the shooting game realistically. For example, even if the enemy's spaceship 13 is positioned relatively closely to the player's spaceship 10 in a peripheral area of the perspective image 9, the game player can easily aim at the enemy's spaceship 13. Therefore, the game player can easily be readied for shooting at an enemy's spaceship 13 which may suddenly come up closely to the player's spaceship 10.

If the shooting direction is set up parallel to a vertical direction of the projection display screen 3, then the game player can feel easy to aim at a target such as an enemy's spaceship 13, and can aim at and destroy the target wherever the target may appear. Thus, the game player finds the shooting game highly realistic.

The player's spaceship 10 is oriented toward the shooting direction for the following reasons: When the shooting direction is oriented toward outside of the projection display screen 3 for a wider shooting space, a laser beam or a missile is shot at an angle to the direction in which the player's spaceship 10 moves forward, and such a direction of a laser beam or a missile makes the game player feel unrealistic in the shooting game. The player's spaceship 10 is oriented toward the shooting direction to prevent the game player from feeling unrealistic in the shooting game. Since the player's spaceship 10 is oriented toward the shooting direction oriented toward outside of the projection display screen 3, the player's spaceship 10 flies with its front end tilted toward the shooting direction, i.e., the direction of the front end of the player's spaceship 10 does not agree with the direction of flight of the player's spaceship 10, also making the game player feel unrealistic in the shooting game. Accordingly, the player's spaceship 10 should be oriented toward the shooting direction oriented toward outside of the projection display screen 3 in a manner to prevent the game player from feeling unrealistic in the shooting game. In this embodiment, the front end of the player's spaceship 10 is positioned substantially intermediate between the direction of flight of the player's spaceship 10 and the shooting direction, with a rotation ratio coefficient kpr=0.5 as described later on.

The camera position at the rear viewpoint is moved toward the player's spaceship 10 (the shooting direction), i.e., the direction of movement of the player's spaceship 10, in order to further prevent the game player from feeling unrealistic due to disagreement between the direction of the front end of the player's spaceship 10 and the direction of flight of the player's spaceship 10. The camera position at the rear viewpoint is moved (rotated or translated) toward the player's spaceship 10 at an equal distance so that the observed size of the player's spaceship 10 remains unchanged. If the camera position at the rear viewpoint is directly behind the front end of the player's spaceship 10 with respect to the direction of the front end thereof, then the game player feels unrealistic in that the front end of the player's spaceship 10 is tilted with respect to the shooting direction. Therefore, the position of the rear viewpoint may be moved to a position between a reference hypothetical rear viewpoint position and a position directly behind the front end of the player's spaceship 10 in a manner to prevent the game player from feeling unrealistic. In this embodiment, the position of the rear viewpoint is moved to a substantially intermediate position (with a rotation ratio coefficient kcr= 0.4 as described later on) between the hypothetical rear viewpoint position and the position directly behind the front end of the player's spaceship 10.

The direction of the front end of the player's spaceship 10 is oriented toward the shooting direction and the camera position at the rear viewpoint is moved toward the player's spaceship 10 so that the direction in which the player's spaceship 10 moves forward and the direction of the front end of the player's spaceship 10, the direction of the front end of the player's spaceship 10 and the shooting direction, and the direction in which the player's spaceship 10 moves forward and the shooting direction become close to each other. The direction of the front end of the player's spaceship 10 may be oriented toward the shooting direction and the camera position at the rear viewpoint may be moved toward the player's spaceship 10, based on experimental control data or a control program. At this time, since an inner side surface of the player's spaceship 10 can be seen, the player's spaceship 10 is displayed with the feeling of a depth.

With the camera position at the rear viewpoint being thus moved, the feeling of a depth is developed in the perspective image 9 to make the perspective image 9 wider. Inasmuch as walls in the perspective image 9 are seen laterally, the walls are seen as moving faster, making the game player feel realistic in the shooting game.

Figure 5:
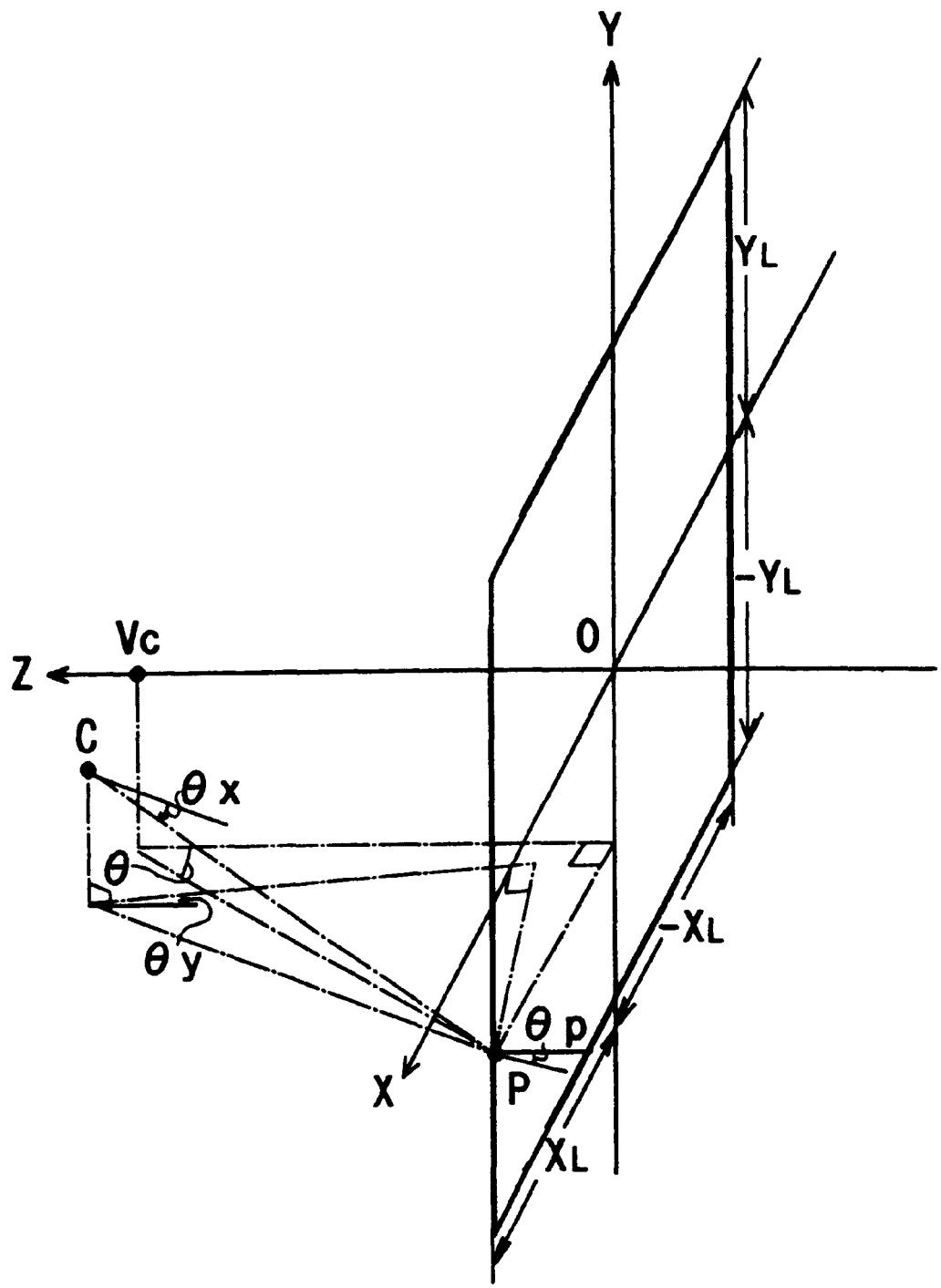
FIG. 5 is a diagram illustrative of a three-dimensional representation for calculating the camera position at the rear viewpoint.

The processing operations of the above functional means will be described in detail below. The player's spaceship moving means moves the player's spaceship 10 on the projection display screen 3 in the direction in which the analog joystick 11 is moved. On the projection display screen 3, the player's spaceship 10 can be moved in a local coordinate system limited to an XY plane (Z=0) by the input unit 16. As shown in FIG. 5, the player's spaceship 10 is movable in a range expressed by the following formulas:

$-XL \leq X \leq XL$ $-YL \leq Y \leq YL$ $Z=0$

Figure 6:
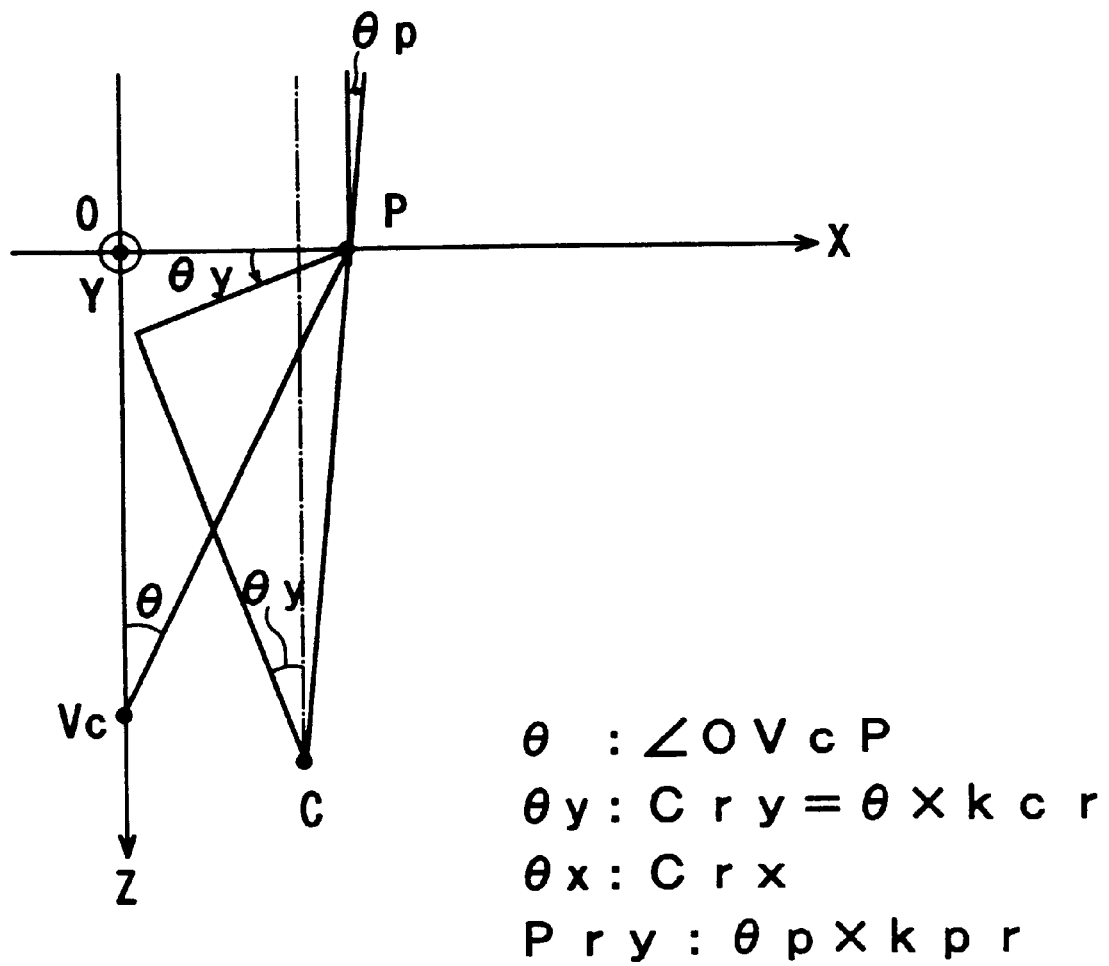
FIG. 6 is a diagram illustrative of a two-dimensional representation (on an X- and Y-axis plane) for calculating the camera position at the rear viewpoint.
Figure 10:
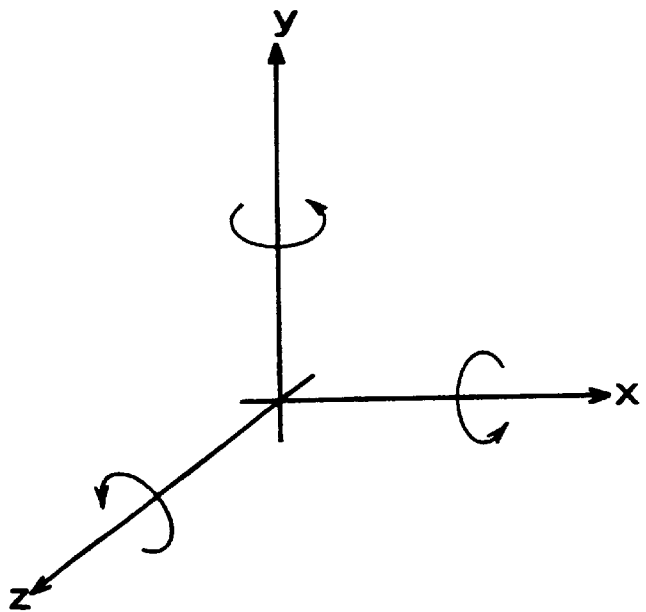
FIG. 10 is a diagram showing directions of rotation about axes shown in FIGS. 5 and 6.
Figure 11:
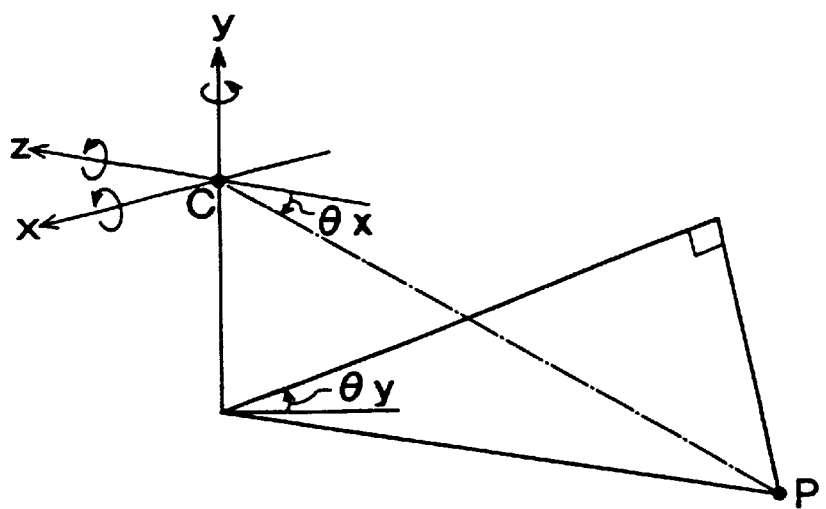
FIG. 11 is a diagram showing angles θx, θy in FIG. 5.
Figure 12:
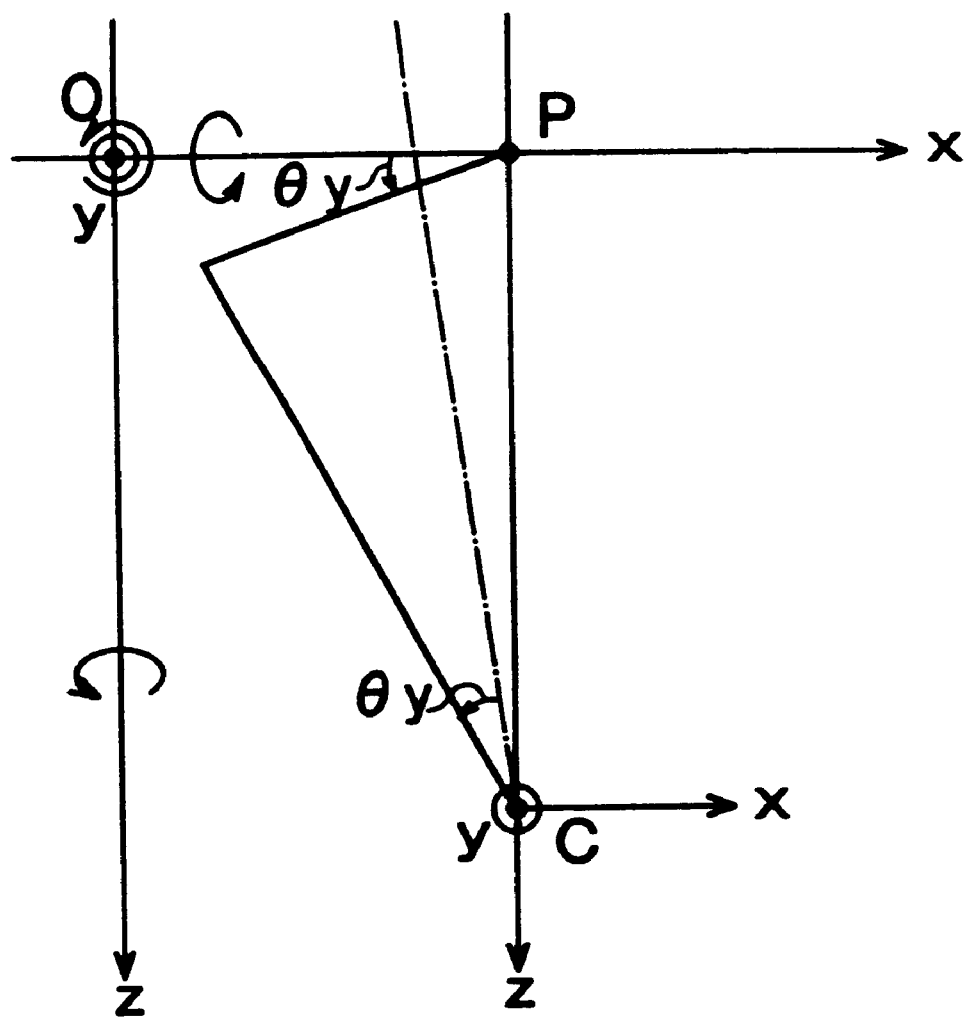
FIG. 12 is a diagram showing an angle θy in FIG. 6.

The directions of rotation about the X-axis (horizontal axis), the Y-axis (vertical axis), and the Z-axis (to-and-fro axis) are shown in FIG. 10. Therefore, angles θx, θy in FIGS. 5 and 6 are expressed as shown in FIGS. 11 and 12.

Three-dimensional graphic representations in this embodiment are given in a world coordinate system, and are in accord with the corkscrew rule. The camera at the rear viewpoint in the three-dimensional graphic representations is basically oriented in a negative direction, rather than a positive direction, of the Z-axis.

The calculation of a virtual camera position Vc that serves as a reference in calculating a camera position to be reached with the rear viewpoint position control means will be described below.

A virtual camera position Vc is provided as a reference for calculating a camera position C to be reached. The virtual camera position Vc is always present in the local coordinate system of the player's spaceship 10. An initial position of the virtual camera position Vc is at Zv in the positive direction of the Z-axis. The position Zv is displaced when the viewpoint is changed, and the rotational angle of the camera itself is always fixed to 0.

Because the player's spaceship 10 needs to be placed necessarily in the camera frame, the virtual camera position vc is moved parallel the X- and Y-axes in order to prevent the player's spaceship 10 from being displaced out of the camera frame as the player's spaceship 10 moves. A range of movement in the camera frame can be calculated from an angle of view Vangle at the virtual camera position Vc and a difference Zv between the virtual camera position Vc and a position P of the player's spaceship 10 on the Z-axis. If the position P of the player's spaceship 10 exceeds the range of movement, a difference Px (Py)—Vcx (Vcy) is added to calculate a new virtual camera position Vc. Vcz represents the difference Zv and has a constant value unless the viewpoint is changed.

The difference between the position P of the player's spaceship 10 and the virtual camera position Vc is calculated as follows:

$dx = Vcx - Px$ $dy = Vcy - Py$ $dz = Vcz - Pz = Vcz = Zv$ $(Pz=0, Vcz=Zv)$

As shown in FIG. 6, a normal line is drawn from the virtual camera position Vc toward the Z-axis of the local coordinate system at the position P of the player's spaceship 10. If the normal line and the X-axis intersects at P, then a triangle OVcP is formed in the XY plane.

An value θ of the angle OVcP of the triangle OVcP is determined as follows:

Angle $OVcP = -\tan^{-1}(dx/dz)$

Then, the camera position C to be reached is calculated. A vector VcP (dx, dy, dz) is rotated about the position P of the player's spaceship 10 through the value θ of the angle OVcP×the rotation ratio coefficient (kcr) to determine the camera position C in a horizontal direction. The rotation ratio coefficient (kcr) is in the range of:

0<rotation ratio coefficient ($kcr$)<1 and is set to kcr=0.4 in this embodiment.

Rotational angles (Crx, Cry, Crz) of the camera position C about the respective axes are determined as follows:

$Crx = \tan^{-1}(dy/\sqrt{dx^2+dz^2})$ $Cry = \text{angle}OvcP \times kcr$ $Crz = 0$ Then, rotational angles (Prx, Pry, Prz) of the player's spaceship 10 are calculated. First, the difference between the position of the player's spaceship 10 and the camera position C is determined as follows:

$dx = Px - Cx$ $dy = Py - Cy$ $dz = Pz - Cz$

The rotational angles Prx, Pyz are variable to any values at any time by the input unit 16.

$$Pry0 = -\tan^{-1}(dx/dz)$$

$$Pry = Pry0 \times kpr$$

kpr: rotation ratio coefficient (0<kpr<1.0)

In this embodiment, the rotation ratio coefficient (kpr) is set to kpr=0.5.

Figure 4:
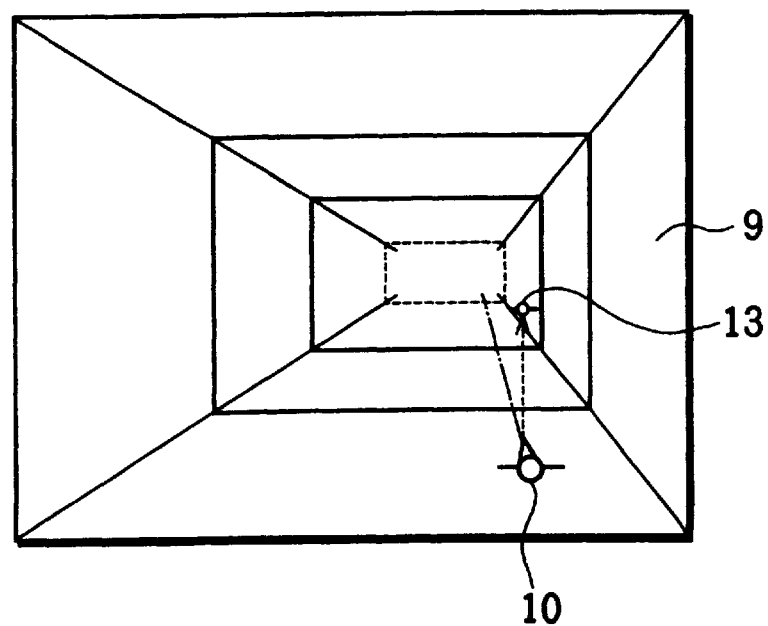
FIG. 4 is a view of an image displayed on the display screen of the shooting game apparatus before the camera position at the rear viewpoint is moved.

Operation of the shooting game apparatus will be described below. It is assumed that the player's spaceship 10 is positioned at a lower central position in the perspective image 9 has shot and destroyed a distant enemy's spaceship 13a in the front, and the player's spaceship 10 is turned to the right, as shown in FIG. 4, in order to engage in a dogfight to shoot down an enemy's spaceship 13 that has appeared relatively closely to the player's spaceship 10 in a peripheral area of the perspective image 9.

An operation sequence of the shooting game apparatus shown in FIG. 1 for such a dogfight in the shooting game will be described below with reference to FIG. 7.

Figure 7:
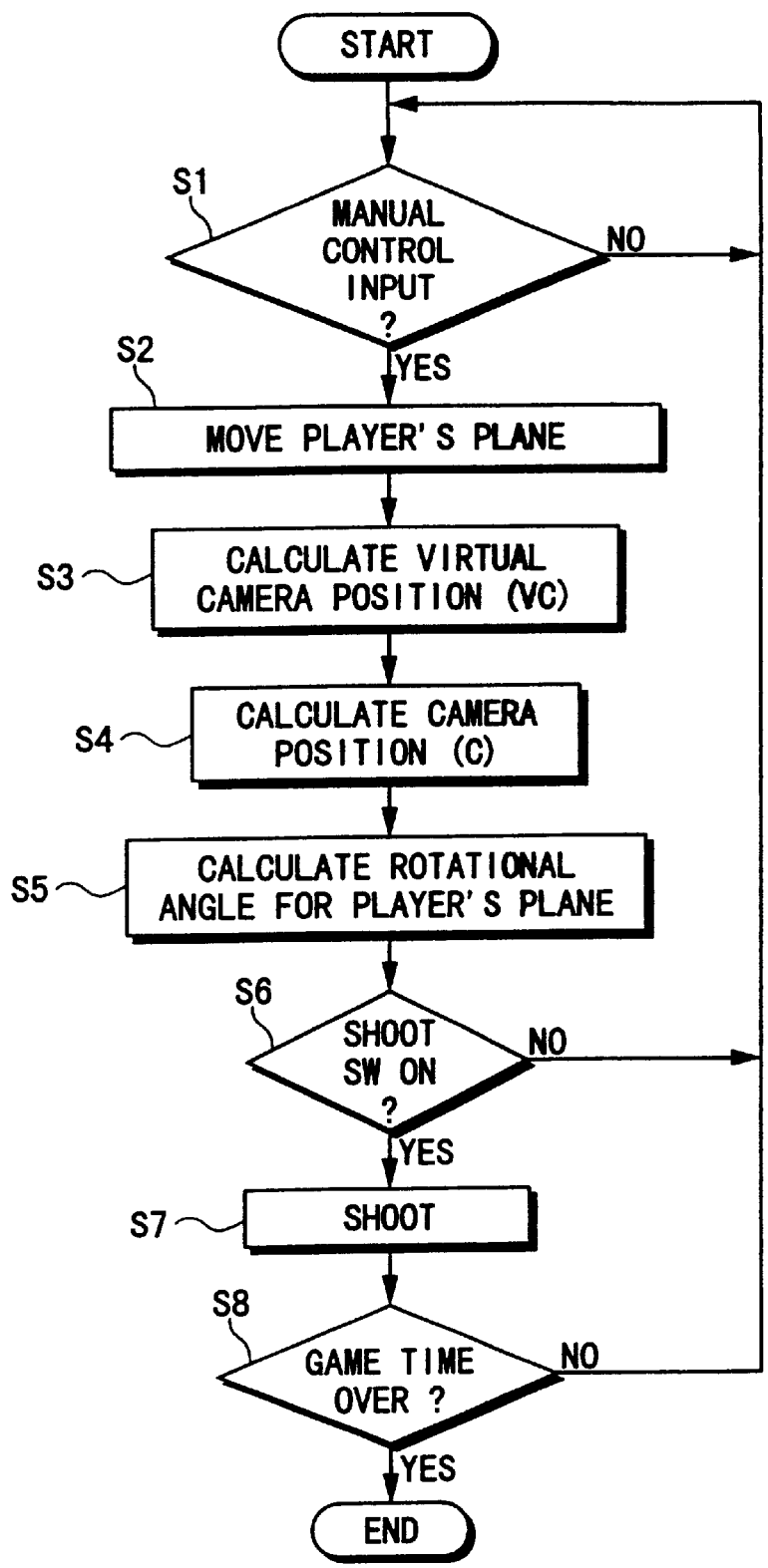
FIG. 7 is a flowchart of an operation sequence of the shooting game apparatus shown in FIG. 1.
Figure 8:
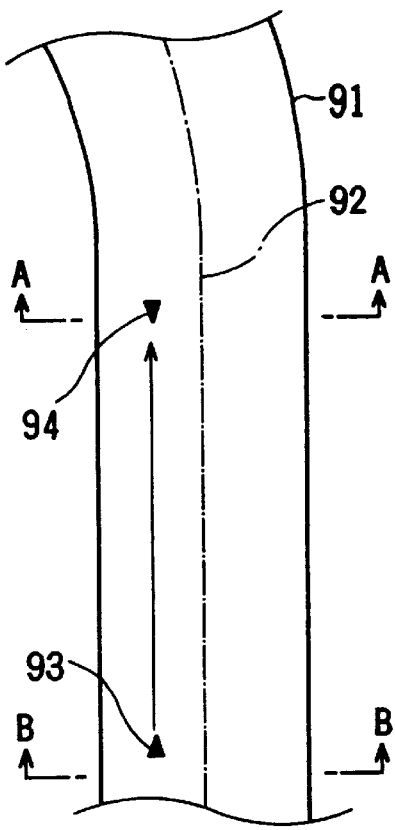
FIG. 8 is a diagram schematically showing a longitudinal section of a perspective image which is displayed on the display screen of a conventional shooting game apparatus.
Figure 9:
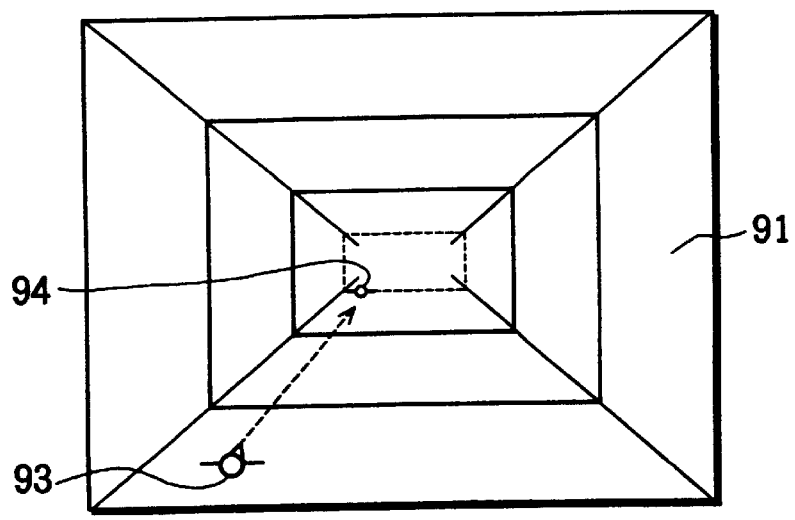
FIG. 9 is a view of the displayed perspective image as viewed at a sectional plane B—B of FIG. 8 from a rear viewpoint.

As shown in FIG. 7, a manual control input signal from the analog joystick 11 is checked to decide whether the player's spaceship 10 is to move or not in step S1. Specifically, the control system 7 is controlled by the shooting game data recorded in the recording medium 19 to decide whether the analog joystick 11 of the input unit 16 is moved (to the right in FIG. 4) from the vertical position or not.

The control system 7 waits until the analog joystick 11 is moved in step Si. If the analog joystick 11 is moved, then the control system 7 is controlled by the shooting game data recorded in the recording medium 19 to move the player's spaceship 10 on the projection display screen 3 in the direction (to the right in FIG. 4) in which the analog joystick 11 has been moved, in step S2.

While moving the player's spaceship 10 in step S2, the control system 7 moves the camera position C at the rear viewpoint in steps S3, S4.

Specifically, the control system 7 calculates a reference virtual camera position Vc in step S3, and calculates a camera position C to be achieved in step S4. At this time, the rotation ratio coefficient (kcr) for the rotational angle of the camera position C is set to 0.4, which has been experimentally established as control data so as not to make the game player feel unrealistic in the shooting game.

In step S5, the control system 7 moves the front end of the player's spaceship 10 toward the shooting direction. The control system 7 calculates a rotational angle to determine the orientation of the front end of the player's spaceship 10. At this time, the rotation ratio coefficient (kpr) for the rotational angle of the player's spaceship 10 is 0.5, which has been experimentally established as control data so as not to make the game player feel unrealistic in the shooting game.

The control system 7 then decides whether the shooting switch has been pressed or not. If not, then control goes back to step S1. If pressed, then control proceeds to step S7.

In step S7, the control system 7 shoots a missile.

In step S8, the control system 7 decides whether a given game time is over. If not, then control returns to step SI to continue the shooting game. If the game time is over, then the shooting game is finished.

As described above, the shooting game apparatus performs a shooting game in three-dimensional graphic images with a rear viewpoint to display the player's spaceship 10 on the projection display screen 3 and shoot from the player's spaceship 10 as it moves forward in the perspective image 9. If a target to be shot at, e.g., an enemy's spaceship 13, is positioned farther away from the player's spaceship 10, the target is closer to the vanishing point at the center of the projection display screen 3, and the game player would find it difficult to hit the target with a laser beam or a missile. The game player can initiate its action to aim at the target only after the game player recognizes a spot which can surely be hit through the recognition of the three-dimensional perspective image 9. Such a recognition cannot easily be gained on the flat projection display screen 3. Therefore, it is important for the game player to quickly recognize a simple action to aim at and hit the target. According to the present invention, such quick recognition of the action can be achieved by allowing the game player to recognize the target in a parallel projected fashion as described below.

In the shooting game, the player's spaceship 10 is moved in the perspective image 9, destroys an enemy's spaceship 13, and moves forward in the perspective image 9. Heretofore, even if the player's spaceship 10 is moved closely to the perspective image 9, a laser beam or a missile is shot from the player's spaceship 10 in the direction in which the player's spaceship 10 moves forward, and may disappear toward the vanishing point at the center of the projection display screen 3, but may not necessarily hit the enemy's spaceship 13 as viewed in the front of the player's spaceship 10. According to this embodiment, the enemy's spaceship 13 is viewed in a parallel projected fashion, and the player's spaceship 10 is turned to have the enemy's spaceship 13 come near the player's spaceship 10 so that the enemy's spaceship 13 will be viewed in front of the player's spaceship 10. Therefore, a laser beam or a missile shot from the player's spaceship 10 will hit the enemy's spaceship 13 as viewed in front of the player's spaceship 10, and hence the enemy's spaceship 13 can easily be aimed at irrespective of whether the enemy's spaceship 13 is positioned far from or closely to the player's spaceship 10.

To allow the enemy's spaceship 13 to be viewed in front of the player's spaceship 10, the shooting direction is oriented toward outside of the projection display screen 3, for thereby increasing a space in which a laser beam or a missile can be shot. When the shooting direction is oriented toward outside of the projection display screen 3, however, the game player feels unrealistic in the shooting game. To minimize such unrealistic feeling, the camera position at the rear viewpoint is moved and the player's spaceship 10 is rotated in order to move the vanishing point closely to the player's spaceship 10 rather than the center of the projection display screen 3.

The shooting game apparatus according to the present invention may be in the form of an arcade game machine, a home game machine, or a general personal computer. If the shooting game apparatus is in the form of an arcade game machine, then the input unit 16 has the analog joystick 11 and various shooting switches, and the image display unit 4 has the television monitor 2 such as a dedicated CRT or liquid display unit and the projection display screen 3. If the shooting game apparatus is in the form of a home game machine, then the input unit 16 comprises a so-called controller having a cross key and various control buttons, and the control system 7 is incorporated in the home game machine, with a television set used as the image display unit 4. If the shooting game apparatus is in the form of a personal computer, then the input unit 16 comprises a keyboard and a mouse, and the image display unit 4 comprises a graphic display unit, with the control system 7 being incorporated in the personal computer.

If the shooting game apparatus is in the form of a home game machine or a personal computer, then the game program is stored in a computer-readable game program storage medium such as a floppy disk, a CD-ROM, a magnetooptical disk, a DVD-ROM, or the like, can be read into the home game machine or the personal computer by a reader.

In the above embodiment, the orientation of the player's spaceship 10 is rotated toward the shooting direction through a horizontal angle of Pry=Pry0×rotation ratio coefficient (kpr), and the camera position at the rear viewpoint is moved toward the direction in which the player's spaceship 10 in a horizontal angle of Cry=angle OVcP×rotation ratio coefficient (kcr). However, the above processing is in the horizontal direction only, and a vertical rotational angle Crx for the camera position and a vertical rotational angle Prx for the player's spaceship 10 may be multiplied by the respective rotation ratio coefficients.

Although a certain preferred embodiment of the present invention has been shown and described in detail, it should be understood that various changes and modifications may be made therein without departing from the scope of the appended claims.

What is claimed is:

1. A shooting game apparatus for displaying a moving shooting object on a display screen and shooting from the moving shooting object in three-dimensional graphic images with a rear viewpoint, comprising:

manual control means operable by a game player for entering a control signal;

shooting object moving means for moving the shooting object forward on the projection display screen in response to the control signal from said manual control means;

shooting processing means for shooting from the shooting object in response to the control signal from said manual control means, and controlling a shooting direction from the shooting object to have an angle toward outside of the display screen with respect to the direction in which the shooting object moves forward;

shooting object orientation control means for controlling an orientation of the shooting object toward the shooting direction; and rear viewpoint position control means for controlling the rear viewpoint toward the shooting direction.

2. A shooting game apparatus according to claim 1, wherein said shooting direction is parallel to a vertical direction of the display screen.

3. A shooting game apparatus according to claim 2, wherein said shooting object orientation control means and said rear viewpoint position control means comprise means for establishing the orientation of the shooting object and a position to be reached by the rear viewpoint such that the direction in which said shooting object moves forward and the direction of said shooting object, the direction of said shooting object and the shooting direction, and the direction in which said shooting object moves forward and the shooting direction become close to each other.

4. A shooting game apparatus according to claim 1, wherein said shooting object orientation control means and said rear viewpoint position control means comprise means for establishing the orientation of the shooting object and a position to be reached by the rear viewpoint such that the direction in which said shooting object moves forward and the direction of said shooting object, the direction of said shooting object and the shooting direction, and the direction in which said shooting object moves forward and the shooting direction become close to each other.

5. A method of performing a shooting game by displaying a moving shooting object on a display screen and shooting from the moving shooting object in three-dimensional graphic images with a rear viewpoint, comprising the steps of:

moving the shooting object forward on the projection display screen in response to a manual control signal;

moving the rear viewpoint toward the shooting object; and controlling an orientation of the shooting object to move toward a shooting direction from the shooting object; and controlling the shooting direction to have an angle toward outside of the display screen with respect to the direction in which the shooting object moves forward.

6. A method according to claim 5, further comprising the step of controlling said shooting direction to be parallel to a vertical direction of the display screen.

7. A method according to claim 6, further comprising the step of establishing the orientation of the shooting object and a position to be reached by the rear viewpoint such that the direction in which said shooting object moves forward and the direction of said shooting object, the direction of said shooting object and the shooting direction, and the direction in which said shooting object moves forward and the shooting direction become close to each other.

8. A method according to claim 5, further comprising the step of establishing the orientation of the shooting object and a position to be reached by the rear viewpoint such that the direction in which said shooting object moves forward and the direction of said shooting object, the direction of said shooting object and the shooting direction, and the direction in which said shooting object moves forward and the shooting direction become close to each other.

9. A computer-readable recording medium storing a control program for performing a shooting game by displaying a moving shooting object on a display screen and shooting from the moving shooting object in three-dimensional graphic images with a rear viewpoint, said control program comprising the steps of:

moving the shooting object forward on the projection display screen in response to a manual control signal;

moving the rear viewpoint toward the shooting object; and controlling an orientation of the shooting object to move toward a shooting direction from the shooting object; and controlling the shooting direction to have an angle toward outside of the display screen with respect to the direction in which the shooting object moves forward.

10. A computer-readable recording medium according to claim 9, wherein said control program further comprises the step of controlling said shooting direction to be parallel to a vertical direction of the display screen.

11. A computer-readable recording medium according to claim 10, wherein said control program further comprises the step of establishing the orientation of the shooting object and a position to be reached by the rear viewpoint such that the direction in which said shooting object moves forward and the direction of said shooting object, the direction of said shooting object and the shooting direction, and the direction in which said shooting object moves forward and the shooting direction become close to each other.

12. A computer-readable recording medium according to claim 9, wherein said control program further comprises the step of establishing the orientation of the shooting object and a position to be reached by the rear viewpoint such that the direction in which said shooting object moves forward and the direction of said shooting object, the direction of said shooting object and the shooting direction, and the direction in which said shooting object moves forward and the shooting direction become close to each other.

* * * * *